(12) United States Patent
Chen

(10) Patent No.: US 7,240,907 B2
(45) Date of Patent: Jul. 10, 2007

(54) TRICYCLE CRANK STRUCTURE

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 176 days.

(21) Appl. No.: 11/209,634

(22) Filed: Aug. 24, 2005

(65) Prior Publication Data

US 2007/0052197 A1    Mar. 8, 2007

(51) Int. Cl.
*B62M 1/02* (2006.01)
(52) U.S. Cl. .................. 280/7.1; 280/259; 280/294
(58) Field of Classification Search ............... 280/282, 280/294, 7.1, 259; 74/594.1, 594.4
See application file for complete search history.

(56) References Cited

U.S. PATENT DOCUMENTS

| | | | | |
|---|---|---|---|---|
| 3,648,542 A | * | 3/1972 | Perotti et al. | 74/594.1 |
| 4,171,822 A | * | 10/1979 | Thun | 280/259 |
| 5,273,300 A | * | 12/1993 | Wells | 280/259 |
| 5,934,155 A | * | 8/1999 | Lai | 74/594.1 |
| 6,708,998 B1 | * | 3/2004 | Blake | 280/259 |
| 2003/0080528 A1 | * | 5/2003 | Damon et al. | 280/259 |

* cited by examiner

*Primary Examiner*—Tony Winner
(74) *Attorney, Agent, or Firm*—Rosenberg, Klein & Lee

(57) ABSTRACT

A tricycle crank structure comprises a wheel axle, a pair of cranks and a pair of pedals. The wheel axle is provided with a pair of non-circular sectional holes at respective ends. The inner wall of each hole is provided with a recess. Each crank has one end pivotally connected to the pedal and another end provided with a connecting section. The connecting section is provided with a tenon to engage with the recess of the hole for quick mounting and dismounting. Each hole may be provided with a pair of through holes, and each crank is provided with an elastic clip for connection.

3 Claims, 4 Drawing Sheets

TRICYCLE CRANK STRUCTURE

BACKGROUND OF THE INVENTION

1. Field of the Invention

The present invention relates to a tricycle crank structure, in particular to a crank structure that is capable of a quick release.

2. Description of the Related Prior Art

A conventional tricycle crank structure has the crank directly mounted to a front wheel with pedals thereon for a toddler to ride. However, before the toddler learns how to ride the pedals, he/she usually pushes the tricycle with his/her feet on the ground to move. During the time, the crank will keep turning the pedals, which may hit the toddler's feet. Thus a design was derived to make the tricycle without cranks and pedals.

After couple weeks, when the toddler is ready to ride the tricycle, the tricycle has to be modified to mount the crank and pedal back to its wheel. This increases the cost of the tricycle and is also complicated.

SUMMARY OF THE INVENTION

It is the primary object of the present invention to provide a tricycle crank structure, which makes changing cranks and pedals as an easy job.

It is another object of the present invention to provide a tricycle crank structure, which is safe for a toddler to ride.

It is a further object of the present invention to provide a tricycle crank structure, which is less expensive in manufacture and is easy to replace parts.

DETAILED DESCRIPTION OF THE PREFERRED EMBODIMEMNTS

Figure 1:
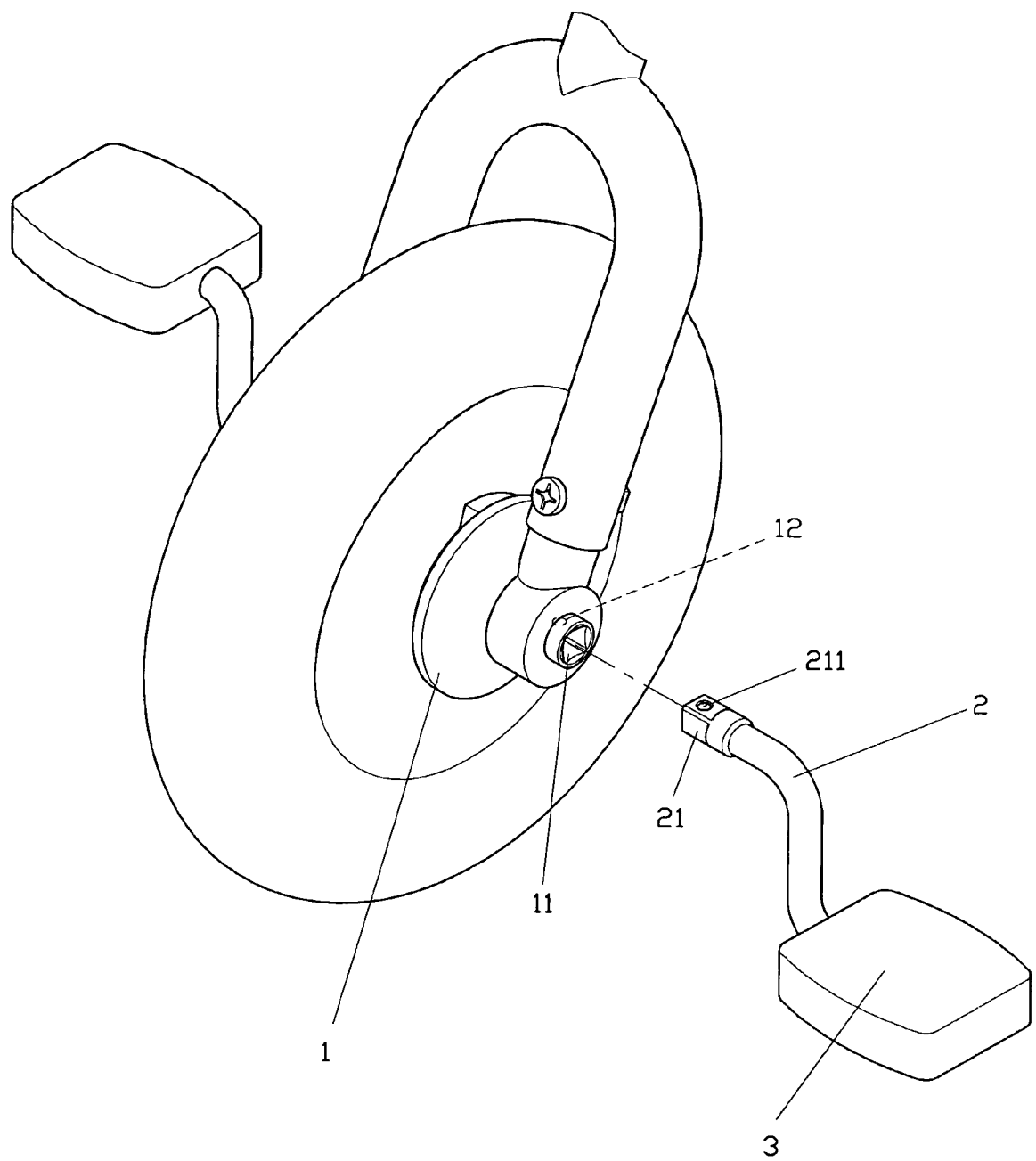
FIG. 1 is an exploded view of a first embodiment of the present invention.

As shown in FIG. 1, the present invention comprises a wheel axle 1, a pair of cranks 2 and a pair of pedals 3.

The wheel axle 1 is pivotally connected to a pair of bearing bases of a front tube. The wheel axle 1 is provided with a pair of non-circular sectional hole 11 at respective ends. The inner wall of each hole 11 is provided with a recess 12.

Each crank 2 has one end pivotally connected to the pedal 3 and another end provided with a connecting section 21. The connecting section 21 has a tenon 211 thereon.

Figure 2:
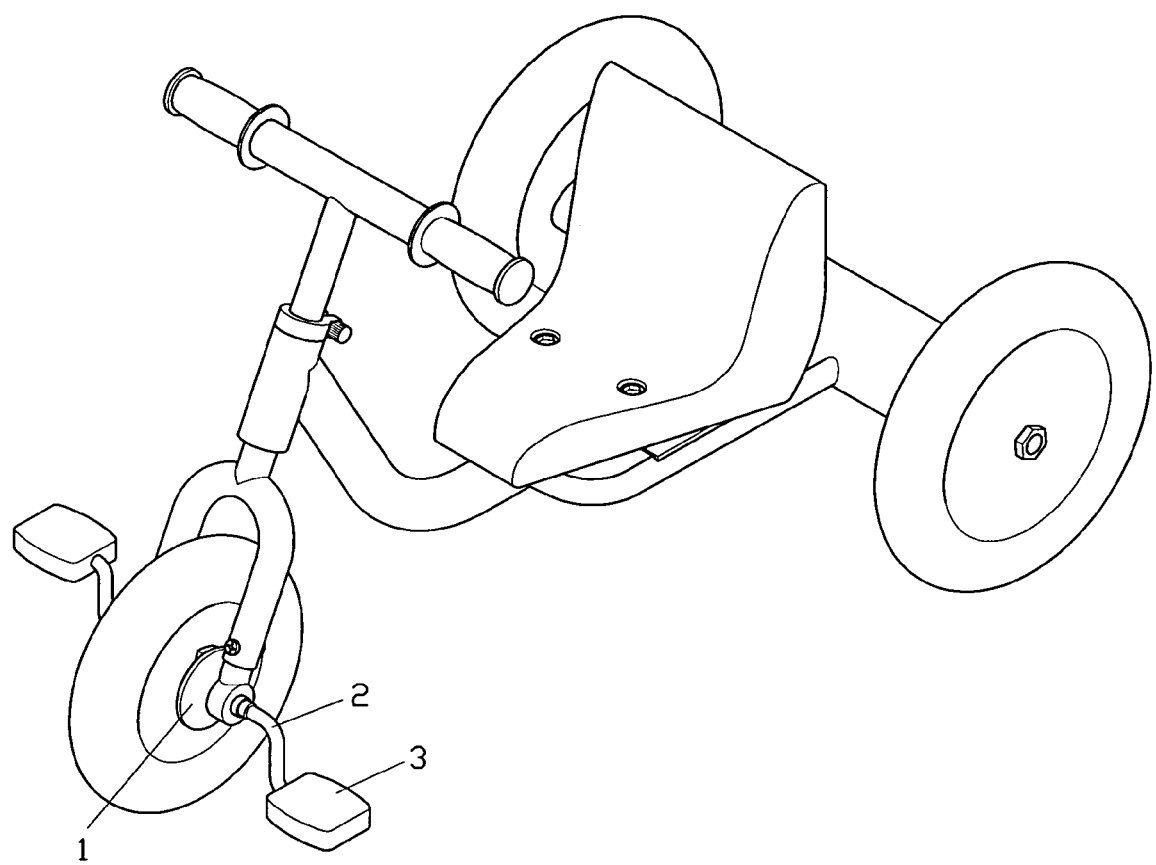
FIG. 2 is a perspective view of the first embodiment of the present invention.

The connecting section 21 of the crank 2 is engaged with the hole 11 of the wheel axle 1, as shown in FIG. 2.

Figure 3:
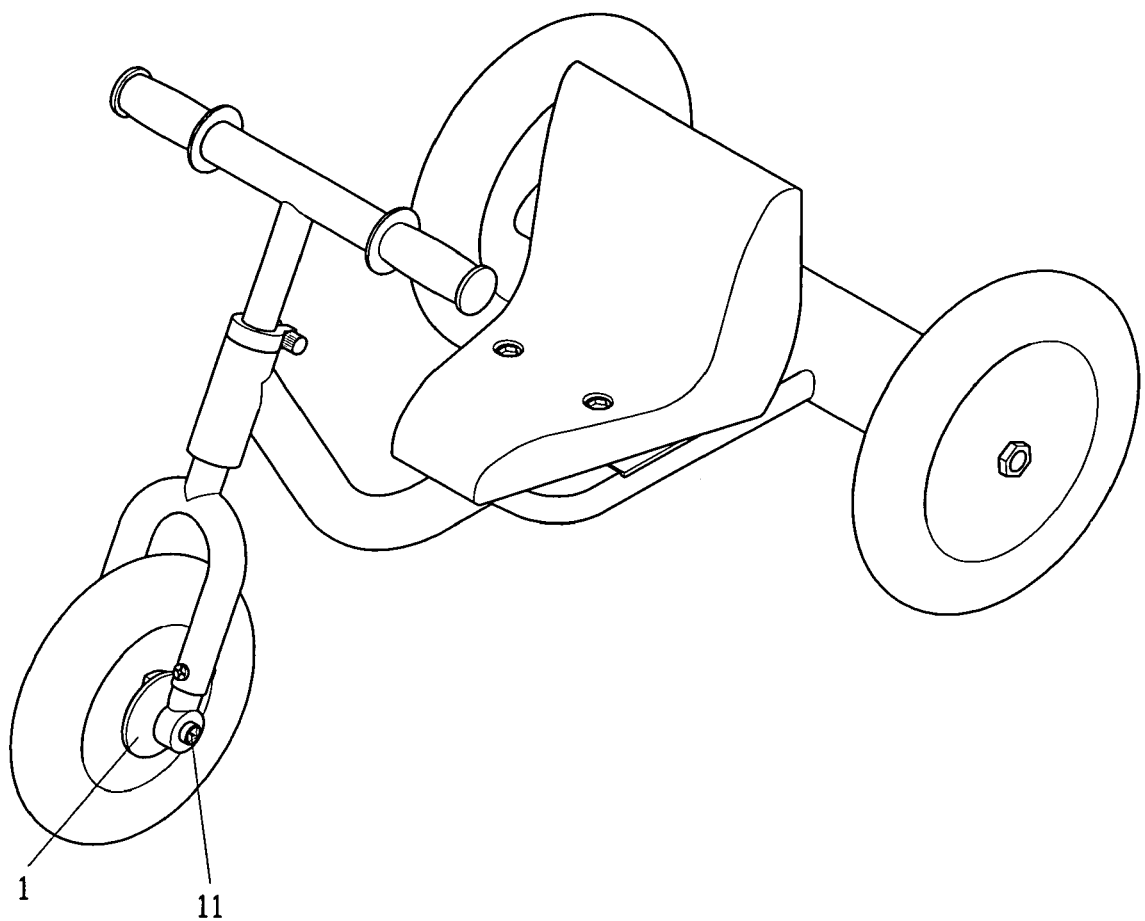
FIG. 3 is a perspective view of the first embodiment of the present invention applied to a tricycle.

By pulling the crank 2 with the pedal 3 outwardly from the wheel axle 1, as shown in FIG. 3, the crank 2 with the pedal 3 is dismounted.

Figure 4:
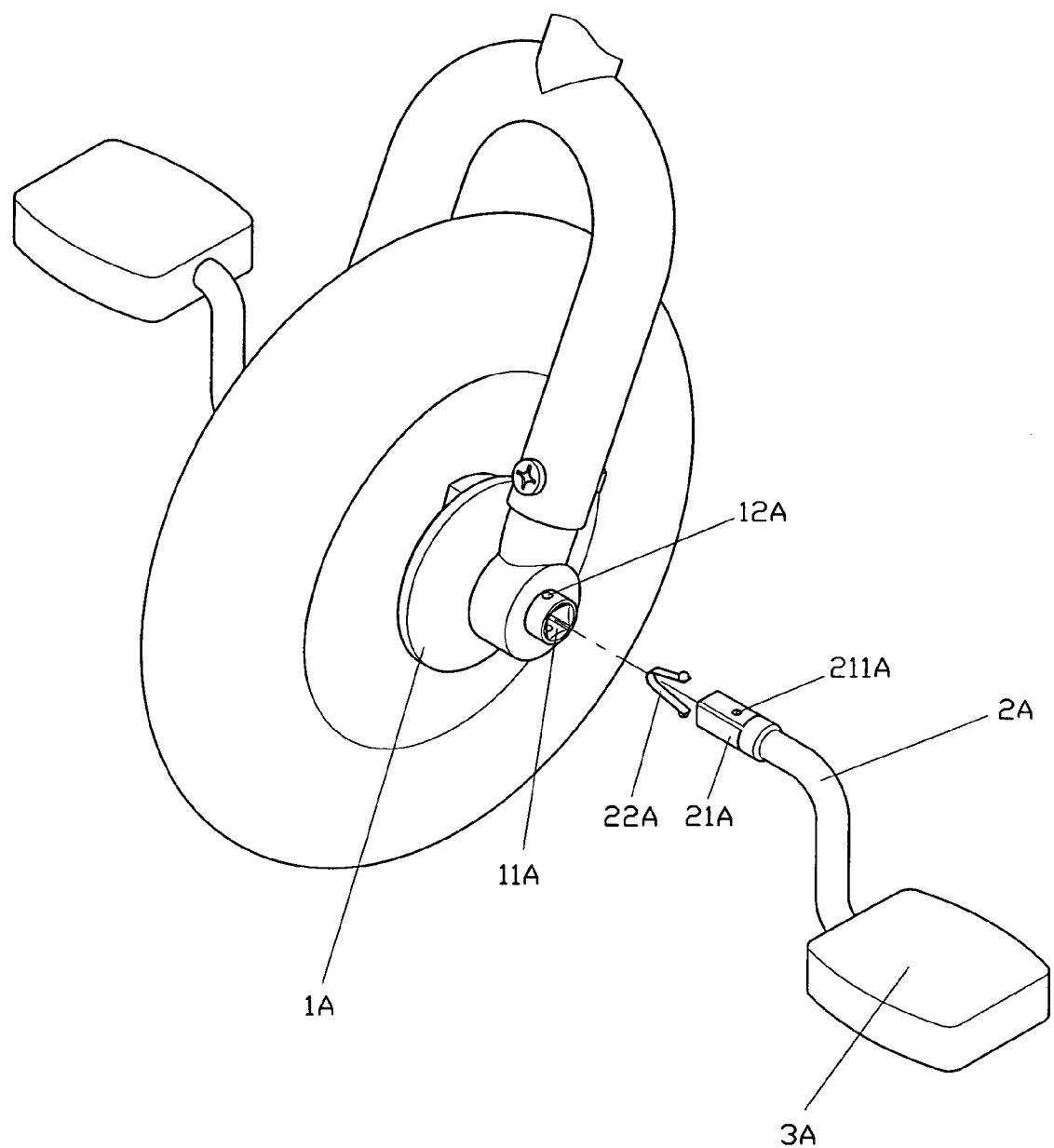
FIG. 4 is an exploded view of a second embodiment of the present invention.

As shown in FIG. 4, a second embodiment of the present invention comprises a wheel axle 1A, a pair of cranks 2A and a pair of pedals 3A.

The wheel axle 1A is provided with a pair of non-circular sectional holes 11A at respective ends. Each hole 11A is formed with a pair of through holes 12A.

Each crank 2A has one end pivotally connected to the pedal 3A and another end provided with a connecting section 21A. The connecting section 21A is provided with a pair of through holes 211A for an elastic clip 22A to protrude therefrom.

Thus, by inserting the connecting section 21A of the crank 2A into the hole 11A of the wheel axle 1A, the elastic clip 22A protrudes from the through holes 12A to secure thereat.

To dismount the present invention, the elastic clip 22A is released from the through holes 12A, the connecting section 21A of the crank 2A may be pulled away from the hole 11A of the wheel axle 1A.

I claim:

1. A tricycle crank structure comprising a wheel axle, a pair of cranks and a pair of pedals;
    said wheel axle comprising a pair of non-circular sectional holes at respective ends;
    each of said cranks having one end pivotally connected to said pedal and another end provided with a connecting section, said connecting section being engaged with said hole of said wheel axle.

2. The tricycle crank structure, as recited in claim 1, wherein each of said holes of said wheel axle comprises an inner wall with a recess thereon, and said connecting section of each crank comprises a tenon corresponding to said recess.

3. The tricycle crank structure, as recited in claim 1, wherein each of said holes of said wheel axle is provided with through holes, and each of said cranks comprises an elastic clip corresponding to said through holes.

* * * * *